Feb. 1, 1966     P. CHURCHILL     3,232,820
RIB STRIPPING FOR INSOLES
Filed Feb. 1, 1962
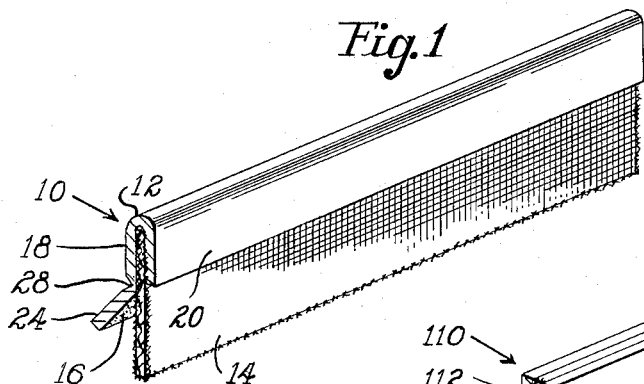
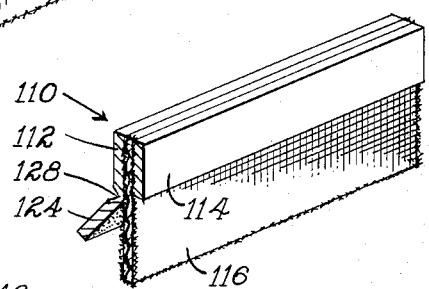
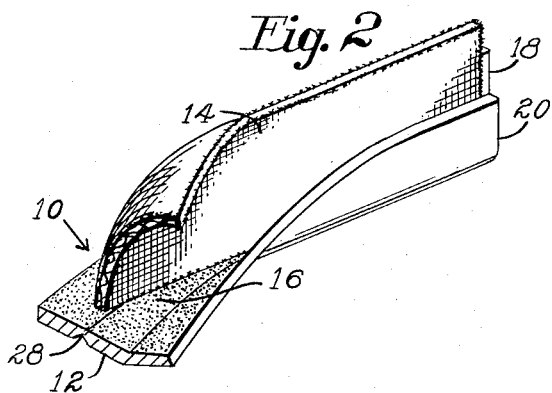
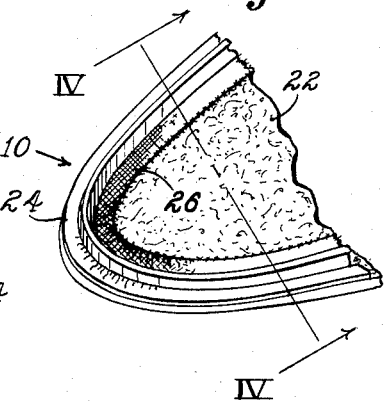
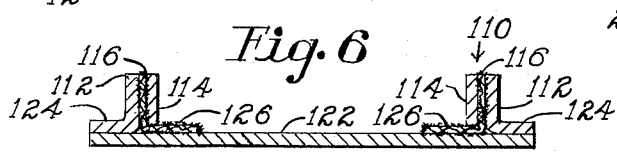
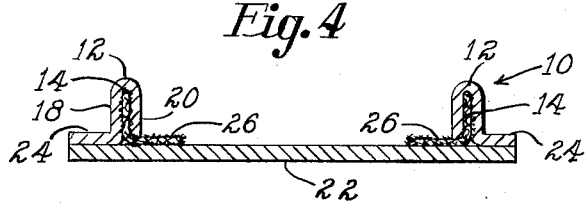
*Inventor*
Philip Churchill
By his Attorney
Maxwell Raphael

United States Patent Office 3,232,820
Patented Feb. 1, 1966

3,232,820
RIB STRIPPING FOR INSOLES
Philip Churchill, Atkinson, N.H., assignor to United Shoe Machinery Corporation, Boston, Mass., a corporation of New Jersey
Filed Feb. 1, 1962, Ser. No. 170,370
2 Claims. (Cl. 161—102)

This invention relates to stripping for attachment to insoles to provide thereon lasting and inseaming ribs in the manufacture of Goodyear welt shoes.

It is an object of the invention to provide an improved composite rib strip that is relatively simple in construction and economical to manufacture, and which, when applied to an insole, will provide a stout rib capable of withstanding the lasting and inseaming strains to which it may be subjected in the manufacture of certain types of welt shoes, such as work shoes and others made of heavy upper materials.

The novel strip will be described hereinafter with reference to the accompanying drawings, and particularly pointed out in the claims.

In the drawings,

FIG. 1 is an enlarged perspective view of a composite strip embodying the invention;

FIG. 1 is a similar perspective view illustrating the manner of assembling the strip shown in FIG. 1;

FIG. 3 is a perspective view of the toe portion of an insole to which the novel composite strip has been secured;

FIG. 4 is a transverse section along the line IV—IV of FIG. 3;

FIG. 5 is an enlarged perspective view of a different embodiment of the invention; and FIG. 6 is a view similar to FIG. 4, illustrating the strip shown in FIG. 5 attached to an insole.

In manufacturing the composite strip, identified generally by the reference character 10 in FIGS. 1–4, a first strip 12 of a material such as, for example, strong kraft paper or one of the several types of commercially available latex bonded felted fibrous materials, is combined with a strip of canvas 14. Before combining the two strips 12, 14, the strip 12 will preferably have been coated, on the side which is to contact the strip 14, with a pressure sensitive cement, as shown at 16. The canvas strip 14 may also, if desired, be similarly coated on one or both of its contacting faces.

Prior to assembling the strips, the strip 12 is folded longitudinally, as shown in FIG. 2, so as to form two plies 18, 20 of unequal width, between which the canvas strip 14 is then inserted, the combined strips being thereafter permanently bonded together by any suitable means, in a manner such as to form a three-ply rib portion comprising the two plies 18, 20 of the folded strip 12 and the portion of the canvas strip 14 disposed between said two plies.

As illustrated in FIGS. 1 and 2, the ply 18 of the folded strip 12 which, when attached to an insole 22, as shown in FIGS. 3 and 4, will constitute the outer ply of the composite rib strip 10, is substantially wider than the ply 20 which will constitute the inner ply of the composite strip, the portion by which said outer ply 18 exceeds in width the inner ply 20 being adapted to be turned outward substantially at right angles to the three-ply rib portion to form an outer flange 24 by which the composite strip is secured to the edge portion of the insole 22, while the portion of the canvas strip 14 which extends beyond the plies 18, 20 is turned inward substantially at right angles to the rib portion to provide an inner flange 26 for anchoring the composite strip to the insole inwardly of its edge portion. In accordance with usual practice, the rib strip is attached fairly close to the margin of an insole, and hence the outer flange portion of the strip is relatively narrow, while the inner flange portion is usually wider in order to provide for firm anchorage of the strip to the insole. Accordingly, in the composite strip embodying the present invention the canvas strip 14 is preferably substantially wider than the narrower ply 20 of the strip 12. To facilitate the turning of the flange portion 24 of the strip 12, which is of stiffer material, the strip is conveniently scored, as at 28, during the step of bonding the strips together, along a line which substantially coincides with the edge of the inner ply 20. In the bonding together of the strips 12, 14, care will preferably be taken to apply relatively heavy pressure on the portions thereof which are to constitute the rib portion of the composite strip, and only slight pressure on the flange portion 24, to enable this portion to be easily separated from the canvas strip 14 during the attachment of the composite strip 10 to an insole.

In the embodiment of the invention illustrated in FIGS. 5 and 6, the composite strip 110 comprises a three-ply rib portion formed by combining two strips 112, 114 of strong but flexible material such as, for example, kraft paper or latex bonded felted fibrous material, and a strip 116 of canvas bonded to each of the strips 112, 114. The sides of the strips 112, 114 which are to be bonded to the strip 116 are preferably coated with a pressure sensitive cement, and either or both contacting faces of the canvas strip 116 may also, if desired, be similarly coated. The strip 112 which, when the composite strip 110 is attached to an insole 122, constitutes the outer ply of the rib portion, is wider than the strip 114, the portion of said strip 112 by which it exceeds the width of the strip 114 being adapted to be turned substantially at right angles to the rib portion in one direction to provide an outer flange 124 by which the composite strip will be attached to the margin of an insole. The canvas strip 116 is wider than the strip 114, and the portion thereof which extends below the lower edge of said strip 114 is adapted to be turned substantially at right angles thereto in the opposite direction to provide an inner attaching flange 126. To facilitate bending the flange portion 124 away from the canvas strip 116 during the attachment of the composite strip to an insole, the strip 112 is scored, as at 128, along a line substantially coinciding with the lower edge of the strip 114.

Either of the rib strips 10, 110 described above may be manufactured and attached to insoles in a continuous operation in the manner suggested in U.S. Letters Patent No. 2,670,480, or may be manufactured and wound in rolls of indefinite length and supplied to shoe manufacturers for attachment to insoles on any suitable commercial rib attaching machine.

When either of the composite strips is attached to an insole, as shown in FIGS. 4 and 6, the outer plies 18, 112 of the rib portion are turned outward and secured to the margin of the insole, at or close to the edge thereof, while the flange portions 26, 126 of the canvas strips 14, 116 are turned inward and secured to the insole inward from the edge thereof, with the lower edges of the inner plies 20, 114 flush with the upper surface of the inner flange portions 26, 126.

Having thus described my invention, what I claim as new and desire to secure by Letters Patent of the United States is:

1. Rib stripping for attachment to insoles to provide thereon lasting and inseaming ribs, said stripping comprising a three-ply rib portion and two single-ply flange portions by which the stripping may be secured to an insole, said rib portion being composed of a first strip of relatively stiff fibrous material coated with adhesive on one of its faces and folded longitudinally into two plies of unequal width and a second strip of more flexible material a portion of which is enfolded between the plies of said first strip and the remaining portion of which is free to permit bending the same at an angle with relation to the narrow ply of the folded strip to provide an inner flange portion, and the marginal portion of the wider ply of said folded strip being provided with a score along a line substantially coinciding with the edge of the narrower ply to permit turning said marginal portion at an angle relative to the rib portion to provide another flange portion adapted to being attached close to the margin of an insole.

2. Rib stripping for attachment to insoles to provide thereon lasting and inseaming ribs, said stripping comprising a three-ply rib portion and two single-ply flange portions by which the stripping may be secured to an insole, said rib portion being composed of two strips of relatively stiff fibrous material of unequal width and each coated with adhesive on one of its faces, and a third strip of more pliable textile material wider than the narrower one of said first named strips and coated with adhesive on at least one of its contacting faces, a portion of said third strip being bonded to each of said two strips while its remaining portion is free to be bent at an angle with relation to the narrower one of said strips to provide an inner attaching flange, and the marginal portion of the wider one of said two strips being provided with a score along a line substantially coinciding with the edge of the narrower strip to permit turning said marginal portion at an angle relative to the rib portion to provide an outer attaching flange.

References Cited by the Examiner
UNITED STATES PATENTS

| | | | |
|---|---|---|---|
| 1,895,709 | 1/1933 | Emerson | 36—22 XR |
| 2,458,500 | 1/1949 | Bertrand et al. | 161—50 |
| 2,774,699 | 12/1956 | Clark | 161—125 |
| 2,847,339 | 8/1958 | Strickland | 161—119 |
| 2,985,555 | 5/1961 | Sherbrook | 161—145 |

EARL M. BERGERT, *Primary Examiner.*